US010680963B2

(12) United States Patent
Miro Panades

(10) Patent No.: US 10,680,963 B2
(45) Date of Patent: Jun. 9, 2020

(54) CIRCUIT AND METHOD FOR CREDIT-BASED FLOW CONTROL

(71) Applicant: Commissariat à l'Energie Atomique et aux Energies Alternatives, Paris (FR)

(72) Inventor: Ivan Miro Panades, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 1 day.

(21) Appl. No.: 15/642,497

(22) Filed: Jul. 6, 2017

(65) Prior Publication Data
US 2018/0013689 A1    Jan. 11, 2018

(30) Foreign Application Priority Data
Jul. 6, 2016   (FR) ...................................... 16 56466

(51) Int. Cl.
| | |
|---|---|
| *H04L 12/801* | (2013.01) |
| *H04L 12/863* | (2013.01) |
| *G06F 3/06* | (2006.01) |
| *G06F 5/10* | (2006.01) |
| *G06F 5/12* | (2006.01) |
| *H04L 12/835* | (2013.01) |

(52) U.S. Cl.
CPC ............ *H04L 47/39* (2013.01); *G06F 3/0656* (2013.01); *G06F 5/10* (2013.01); *G06F 5/12* (2013.01); *H04L 47/30* (2013.01); *H04L 47/621* (2013.01); *H04L 47/6245* (2013.01)

(58) Field of Classification Search
CPC ... H04L 47/39; H04L 47/6245; H04L 47/621; H04L 47/30; G06F 5/12; G06F 5/10; G06F 3/0656; G06F 15/163
See application file for complete search history.

(56) References Cited

U.S. PATENT DOCUMENTS

| | | | | |
|---|---|---|---|---|
| 7,525,978 | B1 * | 4/2009 | Tabatabaee | ........... H04L 47/522 370/411 |
| 9,621,467 | B1 * | 4/2017 | Seo | ........................ H04L 47/125 |
| 2013/0268705 | A1 * | 10/2013 | Maji | .................... G06F 13/4291 710/110 |

(Continued)

OTHER PUBLICATIONS

Preliminary Seach Report in French Patent Application No. 1656466 dated Feb. 23, 2017, 2 pages.

(Continued)

*Primary Examiner* — Jackie Zuniga Abad
(74) *Attorney, Agent, or Firm* — Moreno IP Law LLC

(57) ABSTRACT

A receiving circuit of a communications link comprises: a first data buffer configured to input, under control of a first clock signal, data of a first data stream transmitted by a transmitting circuit, and to generate a credit trigger signal indicating when a data value is read from the first data buffer, wherein data is read from the first data buffer, or from a further data buffer coupled to the output of the first data buffer, under control of a second clock signal; and a credit generation circuit configured to generate, based on the credit trigger signal, a credit signal for transmission to the transmitting circuit under control of the first clock signal, the credit signal indicating that one or more further data values of the first data stream can be transmitted by the transmitting circuit.

11 Claims, 4 Drawing Sheets

(56) References Cited

U.S. PATENT DOCUMENTS

2016/0092357 A1* 3/2016 Rehana ............... G06F 1/26
  711/119
2017/0214514 A1* 7/2017 Manohar ............... G06F 1/12

OTHER PUBLICATIONS

"ARM CoreLink TLX-400 Network Interconnect Thin Links Supplement to ARM CoreLink NIC-400 Network Interconnect Technical Reference Manual," ARM, Mar. 2014, 19 pages.

* cited by examiner

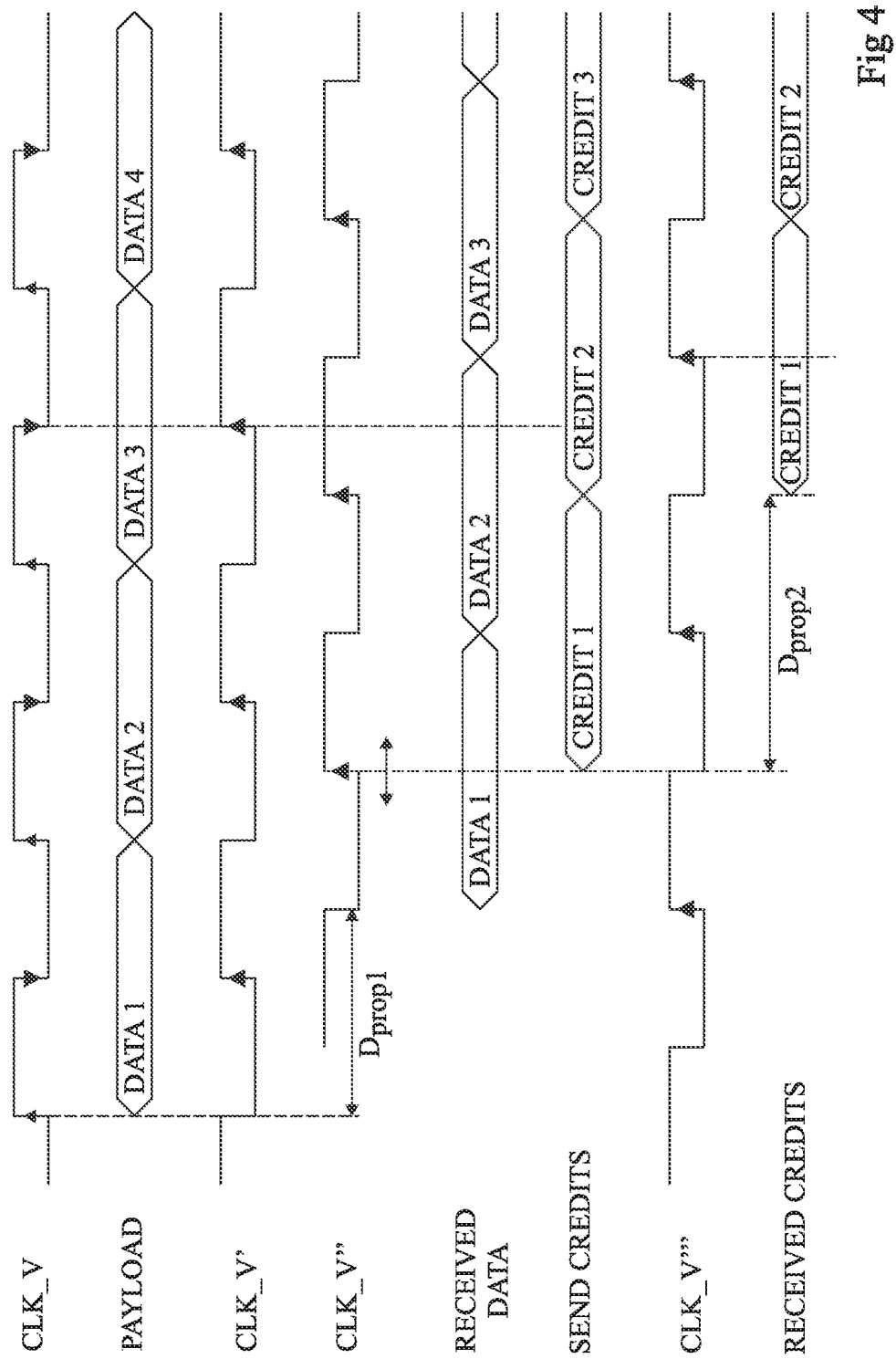

CIRCUIT AND METHOD FOR CREDIT-BASED FLOW CONTROL

FIELD

The present disclosure relates to the field of methods and systems for communications between circuits, and in particular to a method and circuit for credit-based flow control.

BACKGROUND

For communication links between integrated circuits, or between circuits within an integrated circuit, it is generally desirable to limit the number of wires in order to reduce chip area. One solution for reducing the number of wires is to create a plurality of virtual channels that share a single physical channel. This is for example achieved by time multiplexing a plurality of data streams.

In the case of synchronous communications links, a clock signal is used at the receiver in order to correctly receive the transmitted data streams. This clock signal is generally transmitted over the communication link alongside the data. Such a solution is relatively robust against propagation delay variations over the communications link, as the propagation delays of the data streams and of the clock signal will remain substantially equal.

In such synchronous communications links, it has been proposed to implement flow control using a system of credits. A buffer, such as a FIFO (first-in-first-out) buffer is present on the transmission side to store data waiting to be sent over the communications link, and a further buffer, which is also for example a FIFO, is present on the reception side to store the data received over the communications link. If the data transmission rate over the communications link is too high, the FIFO on the reception side may become full, leading an interruption of the data transmission over the communications link. This issue is overcome by credit-based flow control, according to which the transmission circuit may only transmit a data value over the communications link in response to a credit received from the reception circuit. The reception circuit issues a credit each time a data value is read from its FIFO.

While existing solutions for credit-based flow control are relatively effective in preventing overflow in the FIFO of the reception circuit, they tend to require relatively large FIFOs, and bulky circuits for handling credits. There is thus a need in the art for a credit-based flow control solution addressing these issues.

SUMMARY

It is an aim of embodiments of the present disclosure to at least partially address one or more needs in the prior art.

According to one aspect, there is provided a receiving circuit of a communications link, the receiving circuit comprising: a first data buffer configured to input, under control of a first clock signal, data of a first data stream transmitted by a transmitting circuit, and to generate a credit trigger signal indicating when a data value is read from the first data buffer, wherein data is read from the first data buffer, or from a further data buffer coupled to the output of the first data buffer, under control of a second clock signal; and a credit generation circuit configured to generate, based on the credit trigger signal, a credit signal for transmission to the transmitting circuit under control of the first clock signal, the credit signal indicating that one or more further data values of the first data stream can be transmitted by the transmitting circuit.

According to one embodiment, the receiving circuit further comprises: a demultiplexer configured to demultiplex a plurality of data streams, including the first data stream and a second data stream transmitted by the transmitting circuit, and to provide the first data stream to the first data buffer and the second data stream to a second data buffer.

According to one embodiment, the transmitting circuit further transmits a channel selection signal for controlling the demultiplexer to select the first or second data buffer.

According to one embodiment, the first data buffer is a synchronous data buffer, and the receiving circuit further comprising a further data buffer coupled to the output of the first data buffer, wherein the further data buffer is a bi-synchronous data buffer that is read under control of the second clock signal.

According to one embodiment, the first data buffer is a bi-synchronous data buffer, the first data buffer comprising a credit generation circuit configured to generate the credit trigger signal based on a read pointer of the first data buffer and under control of the first clock signal.

According to one embodiment, the credit generation circuit is configured to generate the credit signal and increment a count value in response to an incrementation of the read pointer.

According to a further aspect, there is provided a communications link comprising: the above receiving circuit; and a transmitting circuit configured to transmit the first data stream to the receiving circuit, the transmitting circuit comprising a credit management circuit configured to transmit data values of the first data stream in response to the credit signal.

According to one embodiment, the transmitting circuit further comprises a clock generation circuit adapted to generate: a third clock signal for receiving the credit signal; and a fourth clock signal to be transmitted to the receiving circuit, wherein the first clock signal is a version of the fourth clock signal delayed by a propagation delay.

According to one embodiment, the transmitting circuit is adapted to transmit the data values of the first data stream based on a fifth clock signal.

According to one embodiment, the clock generation circuit comprises: a first variable delay element arranged to generate the third clock signal based on the fifth clock signal; and a second variable delay element arranged to generate the fourth clock signal based on the fifth clock signal.

According to a further aspect, there is provided a method of flow control over a communications link, the method comprising: inputting into a first data buffer under control of a first clock signal, data values of a first data stream transmitted by a transmitting circuit; generating, by the first data buffer, a credit trigger signal indicating when a data value is read from the first data buffer, wherein data is read from the first data buffer, or from a further data buffer coupled to the output of the first data buffer, under control of a second clock signal; and generating, by a credit generation circuit based on the credit trigger signal, a credit signal for transmission to the transmitting circuit under control of the first clock signal, the credit signal indicating that one or more further data values of the first data stream may be transmitted by the transmitting circuit.

According to one embodiment, the method further comprises generating, by a clock generation circuit: a third clock signal for receiving the credit signal by the transmitting circuit; and a fourth clock signal to be transmitted to the receiving circuit, wherein the first clock signal is a version of the fourth clock signal delayed by a propagation delay.

BRIEF DESCRIPTION OF THE DRAWINGS

The foregoing and other features and advantages will become apparent from the following detailed description of embodiments, given by way of illustration and not limitation with reference to the accompanying drawings, in which:

FIG. 4 is a timing diagram illustrating signals in the communication link of FIG. 3 according to an example embodiment;

DETAILED DESCRIPTION

Throughout the following description, the following terms will be given the following definitions:

"data value": a group of data bits filling one storage location in a data buffer and permitted to be transmitted over the communications link in response to the reception of one credit. For example, the group of data bits corresponds to one or several bytes of data transmitted in parallel or series.

"credit signal": an electronic signal indicating to a transmitter that one or more data values of one or more virtual channels can be transmitted.

Figure 1:
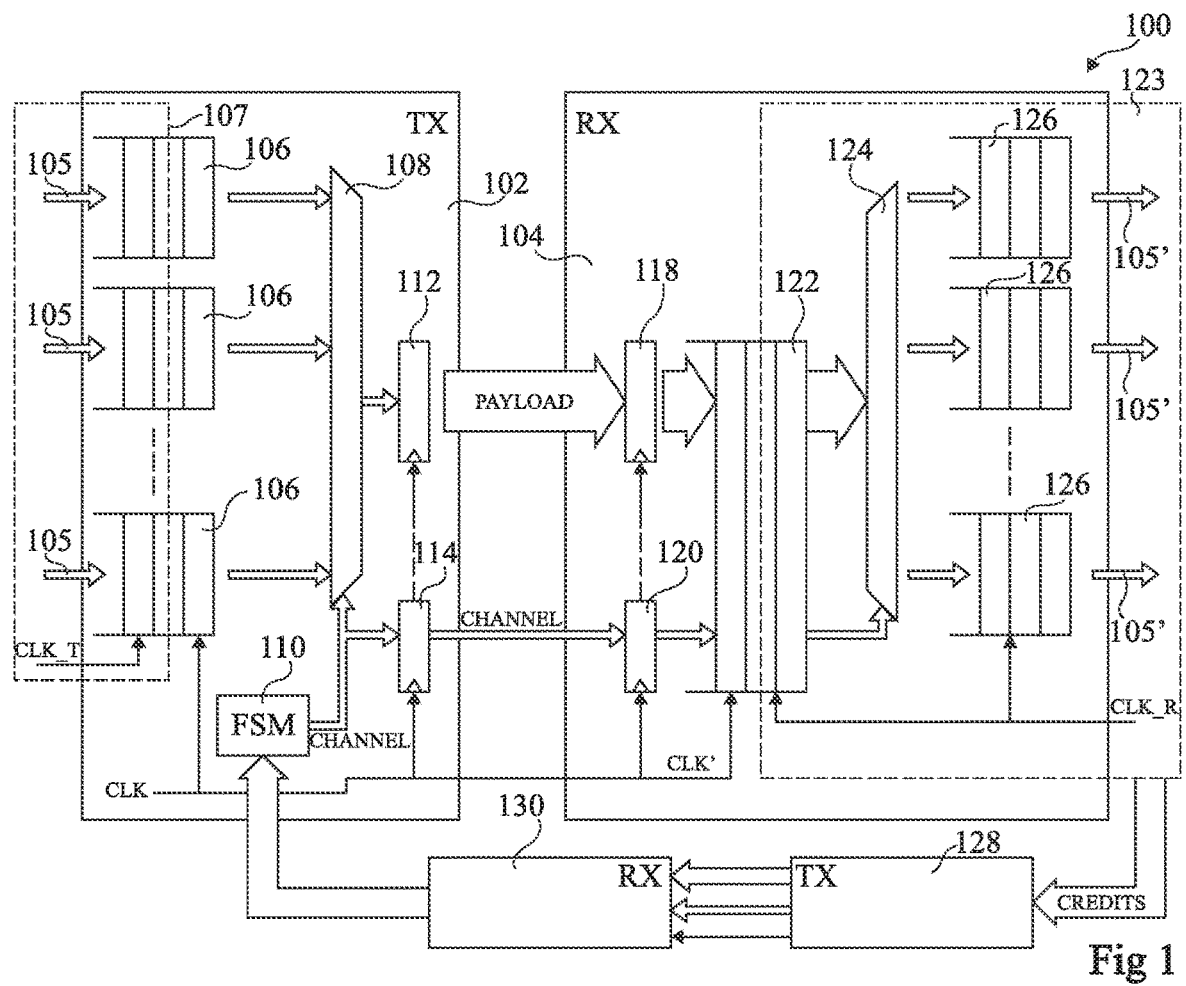
FIG. 1 schematically illustrates a communications link according to an example embodiment.

FIG. 1 illustrates an example of a communications link 100 according to an embodiment that has been proposed. A circuit having some similarities with the circuit of FIG. 1 is for example described in the publication entitled "ARM CoreLink TLX-400 Network Interconnect Thin Links, Revision r0p3, Supplement to ARM CoreLink NIC-400 Network Interconnect Technical Reference Manual", available at www.arm.com. The communications link 100 comprises a transmitting circuit (TX) 102 and a receiving circuit 104.

The transmitting circuit 102 receives a plurality of data streams 105 in corresponding buffers 106, of which three are shown in FIG. 1. The buffers 106 are bi-synchronous FIFO (first-in-first-out) buffers, data being input to these buffers under control of a clock signal CLK_T of a clock domain 107 of the transmitting circuit, and data being output from these buffers under control of a clock signal CLK of the communications link.

Each of the buffers 106 has its output coupled to a corresponding input of a multiplexer 108, which applies time multiplexing to the data streams from the buffers 106 in order to provide a plurality of virtual channels over the communications link. The multiplexer 108 is controlled by a channel selection signal CHANNEL provided by a finite state machine (FSM) 110. The output of the multiplexer 108 is coupled to a flip-flop 112 clocked by the clock signal CLK of the link, which transmits the data stream in the form of a data payload (PAYLOAD) to the receiving circuit 104, over one or more wires. The channel selection signal CHANNEL is provided via a further flip-flop 114, also clocked by the clock signal CLK, to the receiving circuit 104, over one or more further wires. The clock signal CLK is also transmitted to the receiving circuit 104 on one or more further wires.

The receiving circuit 104 comprises a flip-flop 118 receiving the payload, and a flip-flop 120 receiving the channel selection signal CHANNEL. The flip-flops 118, 120 are clocked by the clock signal CLK' received from the transmitting circuit 102. The payload data and channel selection signal are stored in a bi-synchronous FIFO 122, data being input to the FIFO 122 under control of the clock signal CLK', and data being output from the FIFO 122 under control of a clock signal CLK_R of a clock domain 123 of the receiving circuit 104.

The payload data from the FIFO 122 is provided to the input of a demultiplexer 124 controlled by the channel selection signal CHANNEL at the output of the FIFO 122. The outputs of the demultiplexer 124 are coupled to respective FIFOs 126 clocked by the clock signal CLK_R, one FIFO 126 being provided for each data stream 105' received over the communications link.

The FSM 110 in the transmitting circuit permits data values of a channel to be transmitted only if a corresponding credit has been received from the receiving circuit 104. The credits are generated by the receiving circuit 104 based on the data output from the synchronous FIFO buffers 126. The credits being generated in the clock domain 123 of the receiving circuit, they are transmitted to the transmitting circuit 102 via a virtual channel of a further communications link formed of a transmitting circuit 128 and a receiving circuit 130, which are similar to the circuits 102 and 104 respectively.

A drawback of the communications link 100 of FIG. 1 is that the use of the transmitting and receiving circuits 128, 130 for the transmission of credits to the transmitting circuit 102 introduces a significant latency. This leads to FIFOs in the circuit that are relatively large. Indeed, the size of the FIFOs, and thus the number of credits that are available, should be greater than the number of clock cycles needed for an outward data transmission and return credit transmission. In the circuit of FIG. 1, the flip-flops 112, 118 of the circuits 102, 104, and the corresponding flip-flops of the circuits 128, 130, will each introduce a delay of one clock cycle, and the bi-synchronous FIFO 122, and those of the circuits 128, 130, will each introduce a delay of up to three cycles, leading to an overall delay of around 17 cycles.

Figure 2:
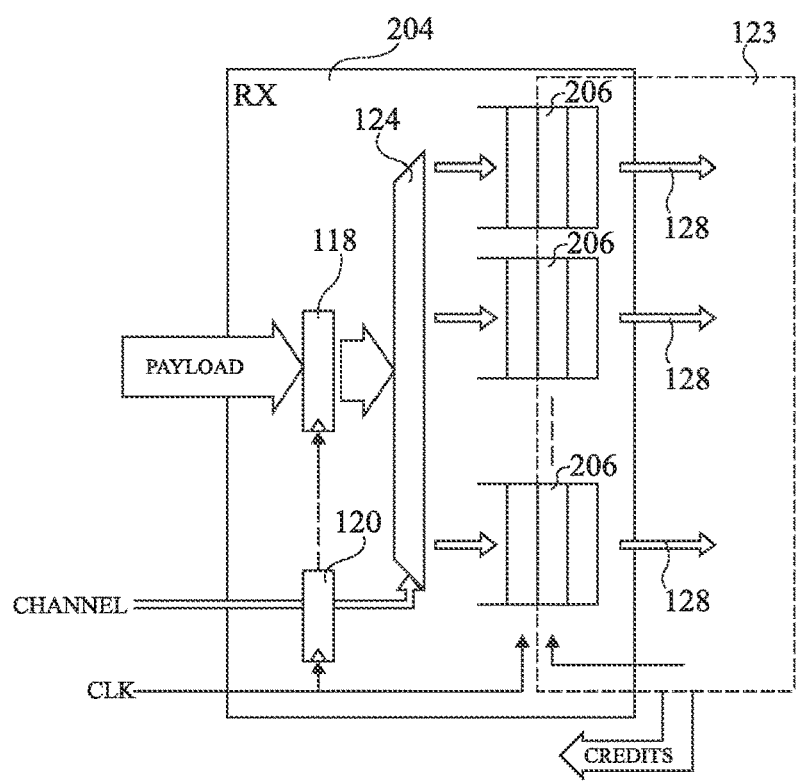
FIG. 2 schematically illustrates a receiver of a communications link according to an alternative embodiment to that of FIG. 1.

FIG. 2 illustrates a receiving circuit 204 according to an alternative implementation to the receiving circuit 104 of FIG. 1. Many features of the receiving circuit 204 are the same as those of the circuit 104, and like features have been labelled with like reference numerals and will not be described again in detail. In the receiving circuit 204, the bi-synchronous FIFO 122 is omitted, and the FIFOs 126 are replaced by bi-synchronous FIFOs 206. While such a solution allows the latency to be reduced by one cycle in each direction, the latency is still relatively high.

Figure 3:
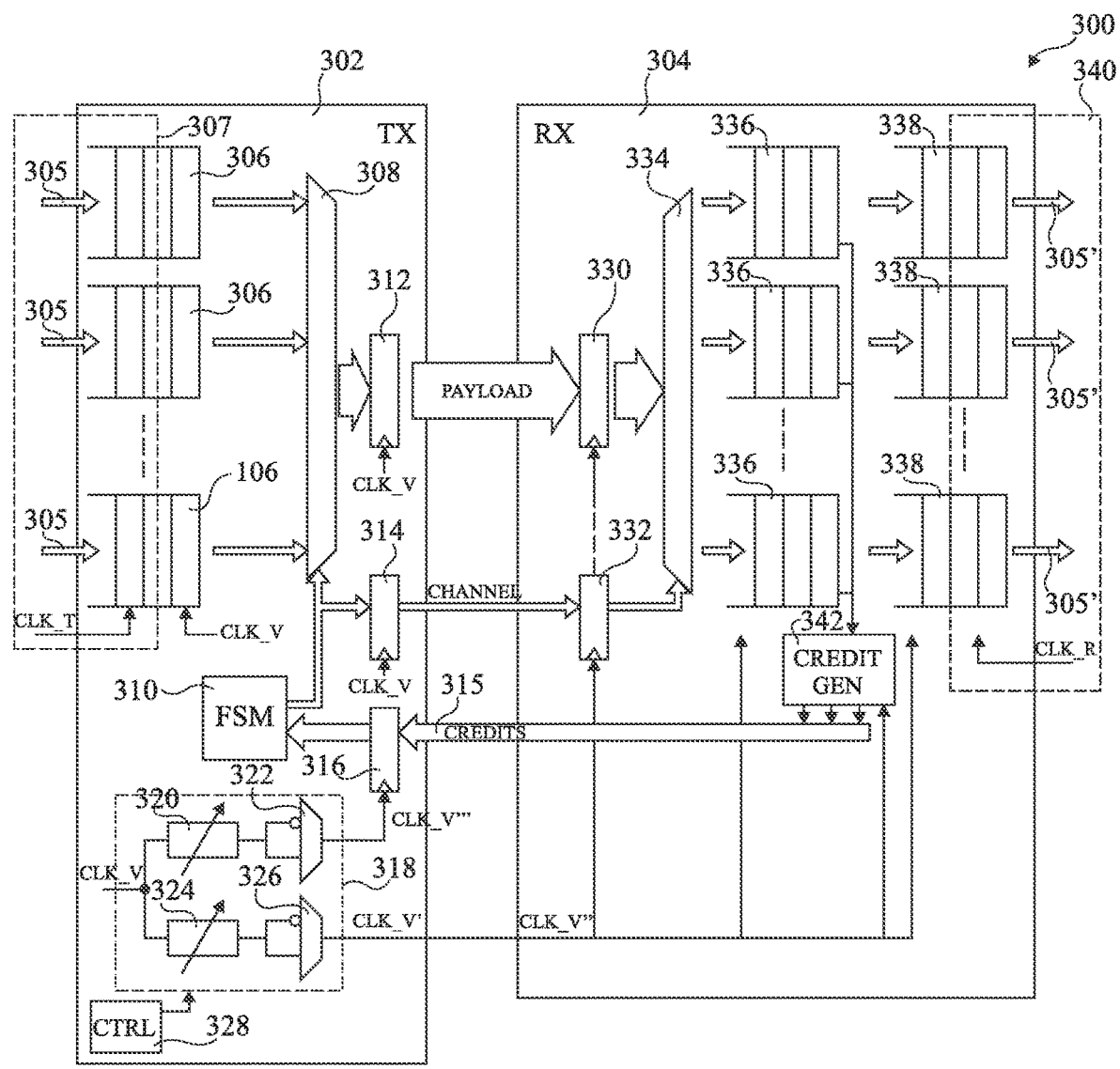
FIG. 3 schematically illustrates a communications link according to an example embodiment of the present disclosure.

FIG. 3 schematically illustrates a communication link 300 according to an example embodiment of the present disclosure.

The communications link 300 for example comprises a transmitting circuit (TX) 302 and a receiving circuit (RX) 304.

The transmitting circuit 302 for example receives a plurality of data streams 305 in corresponding buffers 306, three of which are shown in the example of FIG. 3. The number of FIFOs 306 will depend on the number of data streams, and could be equal to one or more. The FIFOs 306 are for example bi-synchronous FIFOs, data being input to these buffers under control of a clock signal CLK_T of a clock domain 307 of the transmitting circuit, and data being output from these buffers under control of a clock signal CLK_V of the communications link.

Each of the FIFOs 306 for example has its output coupled to a corresponding input of a multiplexer 308, which applies time multiplexing to the data streams from each buffer 306 in order to provide a plurality of virtual channels over the communications link. The multiplexer 308 is for example controlled by a channel selection signal CHANNEL provided by credit management circuit, implemented for example by a finite state machine (FSM) 310. The output of the multiplexer 308 is for example coupled to a flip-flop 312 clocked by a clock signal CLK_V of the link, which transmits the data stream in the form of a data payload (PAYLOAD) to the receiving circuit 304, over one or more wires. The channel selection signal CHANNEL is provided via a further flip-flop 314, also clocked by the clock signal CLK_V, to the receiving circuit 304, for example over one or more further wires. Credits (CREDITS) are for example received from the receiving circuit 304 on one or more input wires 315, these wires being coupled to the input of a flip-flop 316 clocked by a clock signal CLK_V'''.

In some embodiments, the clock signal CLK_V is transmitted to the receiving circuit 304. However, in the embodiment of FIG. 3, a further clock signal CLK_V' is transmitted to the receiving circuit 304. Each of the clock signals CLK_V' and CLK_V''' are for example generated by a clock generation circuit 318 based on the clock signal CLK_V. The circuit 318 for example comprises the series connection of a variable delay element 320 and an inverting element 322 for providing the clock signal CLK_V''', and the series connection of a variable delay element 324 and an inverting element 326 for providing the clock signal CLK_V'. The variable delay elements 320, 324 each for example receive the clock signal CLK_V. The inverting elements 322, 326 for example selectively invert the clock signals. The inverting element 322 for example comprises a multiplexer having a non-inverting input and an inverting input each coupled to the output of the variable delay element 320. Similarly, the inverting element 326 for example comprises a multiplexer having a non-inverting input and an inverting input each coupled to the output of the variable delay element 324. The delays introduced by the elements 320, 324, and the inversion or non-inversion of each of the signals by the elements 322, 326, are for example controlled by a control circuit (CTRL) 328.

For example, the control circuit 328 is configured to calibrate the clocks signals CLK_V' and CLK_V''' based on a calibration pattern transmitted over the communications link, the timing being adjusted until the calibration pattern is received correctly. Additionally or alternatively, a bit error rate (BER) of the data signals received via the communications link can be calculated, and the control circuit 328 for example calibrates the timing of the clock signals CLK_V' and CLK_V''' such that the BER is reduced and/or minimized. As yet a further possibility, a stability detector based on early and late error or warning signals can be implemented as described in more detail in the patent application having the same applicant, inventor and filing date as the present application, and entitled "Method and device for improving synchronization in a communications link" (U.S. patent application Ser. No. 15/642,513; now U.S. Pat. No. 10,090,995), the contents of which is hereby incorporated by reference to the extent permitted by the law.

The receiving circuit 304 comprises a flip-flop 330 receiving the payload, and a flip-flop 332 receiving the channel selection signal CHANNEL. The flip-flops 330, 332 are for example clocked by the clock signal CLK_V' received from the transmitting circuit 302, which is relabelled CLK_V'' in the receiver, the signal CLK_V'' including the delay introduced by the wire between the transmitting and receiving circuits 302, 304.

The payload data is for example provided to the input of a demultiplexer 334, which directs received data values to one of a plurality of FIFOs 336 corresponding to each of the virtual channels. This selection is for example based on the channel selection signal CHANNEL provided by the flip-flop 332. The FIFOs 336 are for example clocked by the clock signal CLK_V''. The FIFOs 336 are for example synchronous devices under control of a single clock signal, rather than bi-synchronous devices like the FIFOs 206 of FIG. 2.

The output of each FIFO 336 is for example coupled to the input of a corresponding further FIFO 338. The FIFOs 338 are for example bi-synchronous FIFOs, data values being input into these FIFOs 338 under control of the clock signal CLK_V'', and data being output from these FIFOs 338 under control of the clock signal CLK_R of a clock domain 340 of the receiving circuit 304. The FIFOs 338 output the data streams 305' recuperated from the communications link.

In the embodiment of FIG. 3, a credit signal generation circuit (CREDIT GEN) 342 generates credits based on the states of the synchronous FIFOs 336. For example, the circuit 342 receives a credit trigger signal from each FIFO 336 indicating when a read operation of a data value stored in the FIFO has occurred. For example, in some embodiments this signal corresponds to the read pointer of the FIFO, and a read operation is indicated by an incrementation of this read pointer. The credit signal generation circuit 342 is for example clocked by the clock signal CLK_V'', and outputs the credits, under control of this clock signal, on the wires 315 for transmission to the transmitting circuit 302.

A number of different coding schemes can be used to encode the credit information onto the wires 315. For example, in some embodiments one of the following encoding schemes is used:

One VC (virtual channel)/One Credit: one cycle of the credit signal provides a single credit to the unique virtual channel;

One VC/Many credits: one cycle of the credit signal provides any number of credits to the unique virtual channel;

Many VCs/One credit: one cycle of the credit signal provides a single credit to its associate virtual channel. Each virtual channel has an associated credit signal;

Many VCs/Many Credits: one cycle of the credit signal provides one or more credits to its associated virtual channel, and thus the credit signal indicates, for each channel to be credited, the number of credits to be applied to that channel.

The number of bits used to encode the credit signal on each cycle will depend on the number of virtual channels and the particular credit encoding scheme that is adopted.

In the transmitting circuit 302, the credits are for example received by the FSM 310 via the flip-flop 316. The FSM 310 for example comprises a counter associated with each virtual channel, and increments the corresponding counter for each credit that is received for the given virtual channel. When a data value is waiting in one of the FIFOs 306, and at least one credit is available in the corresponding counter of the FSM 310, the FSM 310 for example controls the multiplexer 308 to select this data value to be transmitted to the receiver. For example, each FIFO 306 for example sends a signal to the FSM 310 indicating the availability of data to be transmitted. One credit is then deducted for this virtual channel, for example by decrementing the count value of the corresponding counter in the FSM 310.

An advantage of the embodiment of FIG. 3 is that credits are generated based on read operations from FIFOs made in the clock domain of the communications link, in other words based on the clock CLK_V. Thus the credits can be transmitted to the transmitting circuit 302 using the same clock signal as is used to receive the data values at the receiving circuit 304. This significantly reduces the number of clock cycles between the transmission of a data value and the reception by the transmitting circuit 302 of the corresponding credit. For example, while the delay in the embodiment of FIGS. 2 and 3 was around 15 or 17 cycles, in the case of FIG. 3, the delay is of only 6 clock cycles. Thus the size of the FIFOs 306 and 336, and the number of bits representing each credit, can be relatively low.

The operations of the circuit of FIG. 3 will now be described in more detail with reference to the timing diagram of FIG. 4.

FIG. 4 illustrates the signal CLK_V, the payload (PAYLOAD) output from the transmitting circuit 302, the clock signal CLK_V' generated by the circuit 318, the clock signal CLK_V" received by the receiving circuit, the data (RECEIVED DATA) received by the receiving circuit, the credits (SEND CREDITS) generated by the circuit 342, the clock signal CLK_V''' and the credits (RECEIVED CREDITS) received by the transmitting circuit 302.

In the example of FIG. 4, the payload comprises data values DATA1, DATA2, etc., transmitted on rising edges of the clock signal CLK_V. Furthermore, in the example of FIG. 4 the clock signal CLK_V' is a simple inversion of the clock signal CLK_V. The clock signal CLK_V" corresponds to the clock signal CLK_V' delayed by a delay DPROP1, equal to the delay introduced by the transmission channel between the transmitting circuit 302 and receiving circuit 304. In the example of FIG. 4, the rising edges of the clock signal CLK_V" are used to clock the received data, this data having been received after substantially the same delay as the propagation delay DPROP1 of the clock signal CLK_V'. The delay element 324 of FIG. 3 can be used to correct small differences between the propagation delays of the PAYLOAD data signal and of clock signal CLK_V'.

Credits CREDIT1, CREDIT2, etc., are for example generated on each rising edge of the clock signal CLK_V", and transmitted to the transmitting circuit 302. The credits are for example received after a propagation delay DPROP2, which is for example substantially equal to the propagation delay DPROP1. The received credits are for example clocked by rising edges of the clock signal CLK_V'''. The relative timing of the clock signals CLK_V and CLK_V''' is for example chosen such that the credits can be correctly received at the transmitting circuit. In the example of FIG. 4, rising edges of the clock signal CLK_V''' are for example adjusted, by the circuit 318 of FIG. 3, to fall at around the mid-point between the transitions of the received credit data signal.

In an alternative embodiment to that of FIG. 3, the synchronous FIFOs 336 could be replaced by bi-synchronous FIFOs, allowing the bi-synchronous FIFOs 338 to be omitted, in a similar manner to the embodiment of FIG. 2. However, in such a case the bi-synchronous FIFOs are for example modified to provide a credit trigger signal, synchronous with the clock CLK_V''', indicating when a read operation has occurred, as will now be described in more detail with reference to FIGS. 5A, 5B and 6. In this way, credits can be generated and transmitted to the transmitting circuit 302 without crossing from one clock domain to another.

Figure 5A:
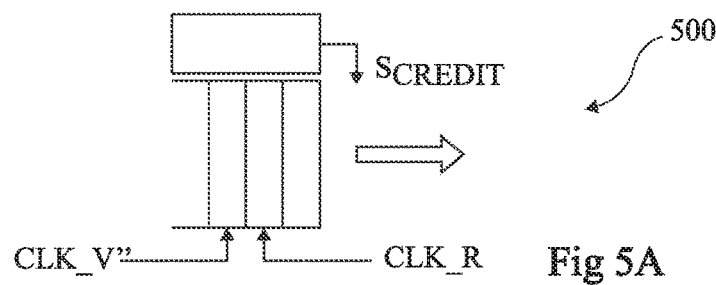
FIG. 5A illustrates a bi-synchronous FIFO according to an example embodiment.

FIG. 5A illustrates a modified bi-synchronous FIFO 500 according to an example embodiment. Such a circuit for example implements each of the bi-synchronous FIFOs of the receiving circuit 302. As with the bi-synchronous FIFOs 338 of FIG. 3, the bi-synchronous FIFO 500 inputs data values under control of the clock signal CLK_V", and outputs data values under control of the clock signal CLK_R. The bi-synchronous FIFO 500 additionally comprises a credit trigger generation circuit 502. The circuit 502 for example determines, based on a read pointer of the FIFO 500, when a read operation has occurred, and activates the output signal $S_{CREDIT}$ accordingly.

Figure 5B:
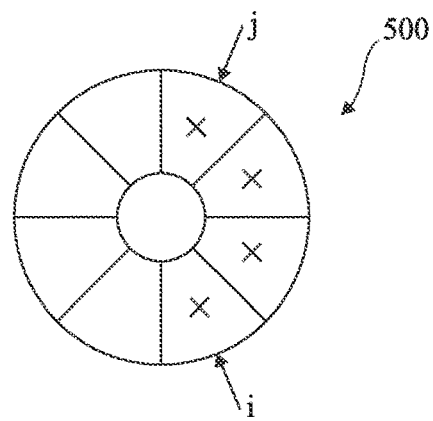
FIG. 5B is a diagram representing operation of the bi-synchronous FIFO of FIG. 5A according to an example embodiment.

FIG. 5B represents the storage locations and read and write pointers of the FIFO 500 according to an example embodiment. In the example of FIG. 5B, the FIFO 500 comprises 8 storage locations each capable of storing a data value, and represented by segments of donut-shaped ring. Of course, in practice the FIFO 500 could comprise a greater number or fewer storage locations. A write pointer i points to the storage location being written to, and a read pointer j points to the storage location being read, and x's in the figure designate storage locations storing data. As indicated above, the write pointer is for example synchronous with the clock CLK_V", whereas the read pointer is for example synchronous with the clock CLK_R.

Figure 6:
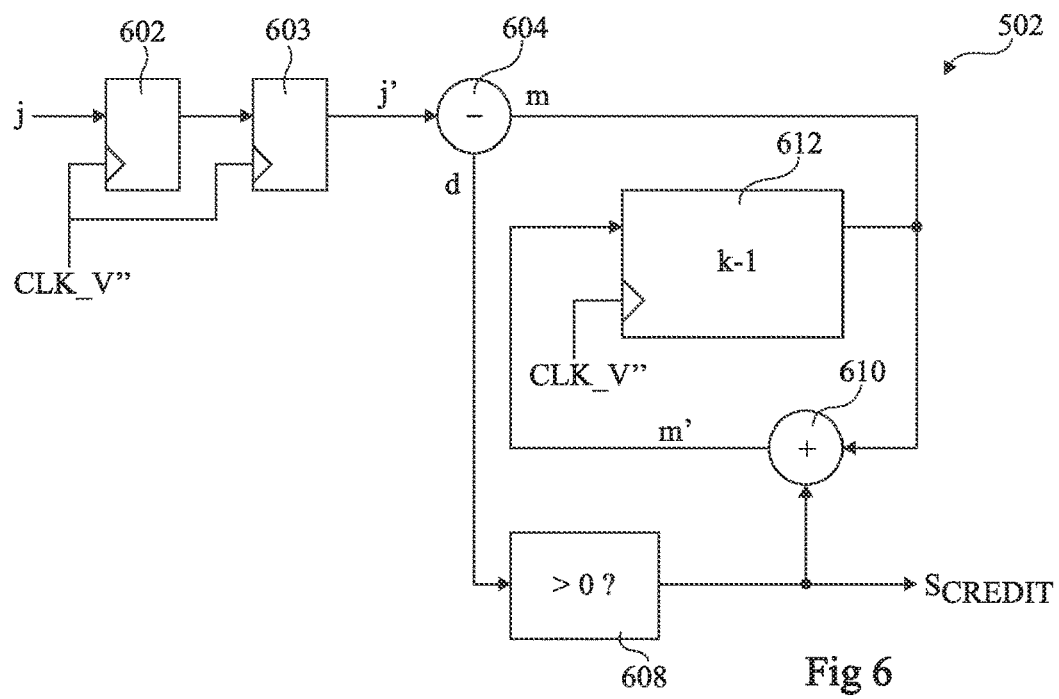
FIG. 6 schematically illustrates a credit generation module of a bi-synchronous FIFO according to an example embodiment.

FIG. 6 illustrates the credit generation module 502 of the FIFO 500 in more detail according to an example embodiment.

The module 502 for example receives the clock signal CLK_V" and the read pointer j. Two flip-flops 602, 603 coupled in series are for example used to resynchronize the value of the read pointer j with the clock signal CLK_V". The resynchronized read pointer j' at the output of the flip-flop 603 is for example provided to a subtractor 604, which subtracts from the value j' a count value m, and provides the result d to a comparator 608. The comparator 608 determines whether the result d is greater than zero, and if so, activates the signal $S_{CREDIT}$ to generate a credit. This signal also causes the count value m to be incremented. For example the count value m is provided to an adder 610, which increments the count value m each time the signal $S_{CREDIT}$ is activated. The result m' of the addition performed by the adder 610 is for example provided to a flip-flop 612, which stores the value m' on each significant clock edge of the clock signal CLK_V". Thus an increment of the read pointer j will cause, following a subsequent significant edge of the clock signal CLK_V", a credit to be issued, and the count value m to be incremented so that another credit will not be issued until j' is again incremented. The count value m is for example initiated at zero following a reset of the module 502.

Figure 7:
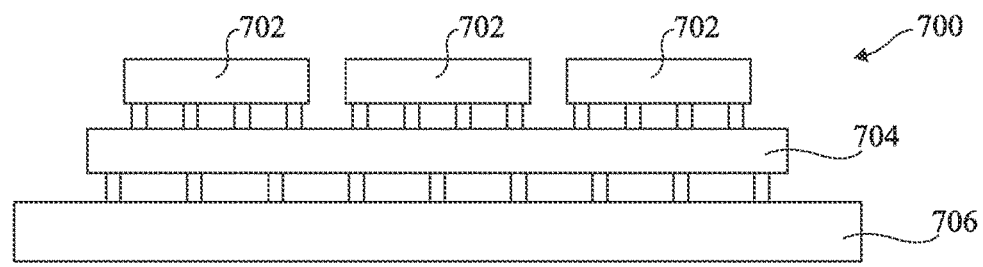
FIG. 7 is a cross-section view of a 3D circuit according to an example embodiment.

FIG. 7 is a cross-section view of a 3D circuit 700 according to an example embodiment.

The circuit for example comprises chiplets 702, three of which are illustrated in the example of FIG. 7. Each chiplet 702 is for example mounted on an interposer 704, which provides active or passive buffering between the chiplets, and for example implements the communications link described herein. The interposer 704 is for example mounted on a package 706.

In alternative embodiments, the communications link described herein could be applied to other applications, such as to communications interfaces within a same integrated circuit, between circuits of an NoC (Network-On-Chip), or to interconnect several NoCs.

An advantage of the embodiments described herein is that the delay for the transmission of a data value across a communications link and for the return of a corresponding credit can be significantly reduced with respect to existing solutions. This permits the size of at least some of the FIFOs of the communications link to be reduced, and also for a reduction in size of the credit counters.

Having thus described at least one illustrative embodiment, various alterations, modifications and improvements will readily occur to those skilled in the art. For example, while in the embodiment of FIG. 3 the clock signal CLK_V' is transmitted to the receiving circuit 304, in alternative embodiments no clock signal could be transmitted, and instead a clock signal could be recuperated by the receiving circuit from the data stream.

Furthermore, while the example embodiment of FIG. 3 presents a single data rate (SDR) implementation, it will be apparent to those skilled in the art that the architecture could be modified to provide a double data rate (DDR) implementation. In such a case, half of the payload data is for example transmitted during the high state of the clock signal CLK_V, and the other half of the data is sent during the low state of the clock signal CLK_V. The registers 312 and 314 for example latch half of the payload on rising edges and the other half of the payload on falling edges. The registers 330, 332 on the receive side operate in a similar manner, latching the data on rising and falling edges. This results in a time multiplexing that allows the number of payload wires to be reduced by a factor of two. Indeed, the full payload can be sent during a full clock cycle using half the number of wires. Alternatively, for a same number of payload wires, the amount of data transmitted can be increased by a factor of two.

Furthermore, it will be apparent to those skilled in the art that any of the FIFOs described in the circuits of FIGS. 3 and 5A could be implemented, in alternative embodiments, by other types of buffer.

What is claimed is:

1. A communications link comprising a transmitting circuit and a receiving circuit, wherein:
   the transmitting circuit is configured to transmit data values of a first data stream to the receiving circuit based on a first clock signal; and
   the receiving circuit is configured to receive from the transmitting circuit, or recuperate from the first data stream, a second clock signal, wherein the receiving circuit comprises:
   a first data buffer configured to input, under control of the second clock signal, data of a first data stream transmitted by the transmitting circuit, and to generate a credit trigger signal indicating when a data value is read from the first data buffer, wherein data is read from the first data buffer, or from a further data buffer coupled to the output of the first data buffer, under control of a third clock signal; and
   a credit generation circuit configured to generate, based on the credit trigger signal, a credit signal for transmission to the transmitting circuit under control of the second clock signal, the credit signal indicating that one or more further data values of the first data stream can be transmitted by the transmitting circuit.

2. The communications link of claim 1, wherein the receiving circuit further comprises:
   a demultiplexer configured to demultiplex a plurality of data streams, including the first data stream and a second data stream transmitted by the transmitting circuit, and to provide the first data stream to the first data buffer and the second data stream to a second data buffer.

3. The communications link of claim 2, wherein the transmitting circuit further transmits a channel selection signal for controlling the demultiplexer to select the first or second data buffer.

4. The communications link of claim 1, wherein the first data buffer is a synchronous data buffer, and the receiving circuit further comprising a further data buffer coupled to the output of the first data buffer, wherein the further data buffer is a bi-synchronous data buffer that is read under control of the third clock signal.

5. The communications link of claim 1, wherein the first data buffer is a bi-synchronous data buffer, the first data buffer comprising a credit generation circuit configured to generate the credit trigger signal based on a read pointer of the first data buffer and under control of the second clock signal.

6. The communications link of claim 5, wherein the credit generation circuit is configured to generate the credit signal and increment a count value in response to an incrementation of the read pointer.

7. The communications link of claim 1, wherein:
   the transmitting circuit comprises a credit management circuit configured to transmit data values of the first data stream in response to the credit signal.

8. The communications link of claim 1, wherein the transmitting circuit further comprises a clock generation circuit adapted to generate:
   a fourth clock signal for receiving the credit signal; and
   a fifth clock signal to be transmitted to the receiving circuit, wherein the second clock signal is a version of the fifth clock signal delayed by a propagation delay.

9. The communications link of claim 8, wherein the clock generation circuit comprises:
   a first variable delay element arranged to generate the fourth clock signal based on the first clock signal; and
   a second variable delay element arranged to generate the fifth clock signal based on the first clock signal.

10. A method of flow control over a communications link comprising a transmitting circuit and a receiving circuit, the method comprising:
    transmitting, by the transmitting circuit, data values of a first data stream to the receiving circuit based on a first clock signal;
    inputting into a first data buffer of the receiving circuit under control of a second clock signal, the data values of the first data stream transmitted by a transmitting circuit, wherein the second clock signal is received by the receiving circuit from the transmitting circuit, or recuperated from the first data stream;
    generating, by the first data buffer, a credit trigger signal indicating when a data value is read from the first data buffer, wherein data is read from the first data buffer, or from a further data buffer coupled to the output of the first data buffer, under control of a third clock signal; and
    generating, by a credit generation circuit based on the credit trigger signal, a credit signal for transmission to the transmitting circuit under control of the second clock signal, the credit signal indicating that one or more further data values of the first data stream may be transmitted by the transmitting circuit.

11. The method of claim 10, further comprising generating, by a clock generation circuit:
a fourth clock signal for receiving the credit signal by the transmitting circuit; and
a fifth clock signal to be transmitted to the receiving circuit, wherein the second clock signal is a version of the fifth clock signal delayed by a propagation delay.

* * * * *